United States Patent
Maruno

(10) Patent No.: US 12,112,336 B2
(45) Date of Patent: Oct. 8, 2024

(54) INFORMATION PROCESSING DEVICE, INFORMATION PROCESSING METHOD, AND PROGRAM

(71) Applicant: HONDA MOTOR CO., LTD., Tokyo (JP)

(72) Inventor: Naoki Maruno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 449 days.

(21) Appl. No.: 17/613,097

(22) PCT Filed: Jun. 14, 2019

(86) PCT No.: PCT/JP2019/023717
§ 371 (c)(1),
(2) Date: Nov. 22, 2021

(87) PCT Pub. No.: WO2020/250435
PCT Pub. Date: Dec. 17, 2020

(65) Prior Publication Data
US 2022/0215399 A1    Jul. 7, 2022

(51) Int. Cl.
*H01M 10/44* (2006.01)
*B60L 53/80* (2019.01)
(Continued)

(52) U.S. Cl.
CPC ............ *G06Q 30/012* (2013.01); *B60L 53/80* (2019.02); *G06Q 30/0635* (2013.01); *G07C 5/008* (2013.01); *G07C 5/10* (2013.01)

(58) Field of Classification Search
CPC ... H02J 7/0042; G06Q 30/0635; G06Q 50/10; B60L 53/80; G07C 5/008; G07C 5/10
(Continued)

(56) References Cited

U.S. PATENT DOCUMENTS

2003/0209375 A1* 11/2003 Suzuki .................... B60L 58/25
180/68.5
2005/0080641 A1* 4/2005 Ronning ................ G06Q 30/02
705/20
(Continued)

FOREIGN PATENT DOCUMENTS

JP        2003-030297         1/2003
JP        A-2003-108850       4/2003
(Continued)

OTHER PUBLICATIONS

Google translate JP2003030297A (Jan. 31, 2003) (Year: 2003).*
(Continued)

*Primary Examiner* — Edward Tso
(74) *Attorney, Agent, or Firm* — Amin, Turocy & Watson, LLP

(57) ABSTRACT

An information processing device of an embodiment includes an acquirer configured to acquire secondary battery information about a secondary battery transmitted from a vehicle equipped with the secondary battery storing electric power for traveling, an analyzer configured to analyze value information of the secondary battery on the basis of the secondary battery information acquired by the acquirer and request information from a secondary-use-related user who uses the secondary battery, and a provider configured to provide provision information about a sale of the secondary battery on the basis of the value information of the secondary battery analyzed by the analyzer.

9 Claims, 9 Drawing Sheets

(51) Int. Cl.
*G06Q 30/012* (2023.01)
*G06Q 30/0601* (2023.01)
*G07C 5/00* (2006.01)
*G07C 5/10* (2006.01)
*H01M 10/46* (2006.01)

(58) Field of Classification Search
USPC .................. 320/104, 107, 132, 134, 149
See application file for complete search history.

(56) References Cited

U.S. PATENT DOCUMENTS

2020/0334722 A1* 10/2020 Kurimoto .......... G06Q 30/0284
2021/0291698 A1* 9/2021 Nishida ............ B60W 50/0097

FOREIGN PATENT DOCUMENTS

| JP | A-2011-248651 | 12/2011 |
| JP | UP-A-2012-173928 | 9/2012 |
| JP | A-2013-084198 | 5/2013 |
| JP | A-2013-172476 | 9/2013 |
| JP | A-2013-218909 | 10/2013 |
| JP | A-2014-054083 | 3/2014 |
| JP | 2015-217798 | 12/2015 |
| JP | B-6128220 | 5/2017 |
| JP | 2018-128769 | 8/2018 |
| WO | 2014/112094 | 7/2014 |

OTHER PUBLICATIONS

Google translate JP2003108850A (Apr. 11, 2003) (Year: 2003).*
Google translate JP2012173928A (Mar. 21, 2013) (Year: 2013).*
International Search Report and Written Opinion for International Application No. PCT/JP2019/023717 mailed on Sep. 10, 2019, 8 pages.
Japanese Office Action for Japanese Patent Application No. 2021-525882 mailed Nov. 29, 2022.

* cited by examiner

| VEHICLE ID | POSITION INFORMATION | ACQUISITION DATE AND TIME INFORMATION | BATTERY ID | SOC [%] | REMAINING CAPACITY [kWh] | FULL CHARGE CAPACITY [kWh] | NUMBER OF TIMES OF CHARGING [TIMES] | BATTERY INFORMATION | VEHICLE INSPECTION DATE |
|---|---|---|---|---|---|---|---|---|---|
| V001 | *** | *** | *** | 80 | 40 | 50 | 59 | *** | 2022/03/23 |
| V002 | *** | *** | *** | 50 | 30 | 60 | 100 | *** | 2019/08/08 |
| ... | ... | ... | ... | ... | ... | ... | ... | ... | ... |

| TERMINAL ID | POSITION INFORMATION | REQUEST DATE AND TIME INFORMATION | REQUIRED BATTERY INFORMATION | REQUIRED QUANTITY [PIECES] | PURCHASE PRICE [YEN/PIECE] |
|---|---|---|---|---|---|
| T100 | * * * | * * * | * * * | 3 | 100000 |
| T101 | * * * | * * * | * * * | 15 | 30000 |
| ... | ... | ... | ... | ... | ... |

| REGION ID | STATE RANK | REQUIRED QUANTITY [PIECES] | TOTAL CAPACITY [Wh] | AVERAGE PURCHASE PRICE [YEN/PIECE] |
|---|---|---|---|---|
| A1 | R2 | 12 | 609 | * * * |
|  | R3 | 54 | 2285 | * * * |
|  | ... | ... | ... | ... |
| A2 | R1 | 3 | 154 | * * * |
|  | R2 | 10 | 300 | * * * |
|  | ... | ... | ... | ... |
| ... | ... | ... | ... | ... |

ID/INFORMATION PROCESSING DEVICE, INFORMATION PROCESSING METHOD, AND PROGRAM

TECHNICAL FIELD

The present invention relates to an information processing device, an information processing method, and a program.

BACKGROUND ART

In recent years, research for promoting the secondary use of batteries installed in electric vehicles has been conducted. In relation to this, technology for predicting a deterioration state of each of a battery before replacement and a replacement candidate battery to extract a replacement battery or determining a secondary use destination on the basis of a use end period predicted from deterioration estimation information of a secondary battery in use is known (see, for example, Patent Literature 1 and 2).

CITATION LIST

Patent Literature

[Patent Literature 1]
Japanese Unexamined Patent Application, First Publication No. 2013-84198
[Patent Literature 2]
Japanese Patent No. 6128220

SUMMARY OF INVENTION

Technical Problem

However, because secondary batteries are often distributed in the market due to large deterioration, accidents, failures, and the like, the number of supplied secondary batteries capable of being used secondarily is insufficient and secondary batteries may not be able to be supplied appropriately.

Aspects of the present invention have been made in consideration of such circumstances and an objective of the present invention is to provide an information processing device, an information processing method, and a program capable of promoting the distribution of secondary batteries for secondary use with a better state.

Solution to Problem

An information processing device, an information processing method, and a program according to the present invention adopt the following configurations.

(1): According to an aspect of the present invention, there is provided an information processing device including: an acquirer configured to acquire secondary battery information about a secondary battery transmitted from a vehicle equipped with the secondary battery storing electric power for traveling; an analyzer configured to analyze value information of the secondary battery on the basis of the secondary battery information acquired by the acquirer and request information from a secondary-use-related user who uses the secondary battery; and a provider configured to provide provision information about a sale of the secondary battery on the basis of the value information of the secondary battery analyzed by the analyzer.

(2): In the above-described aspect (1), the analyzer analyzes a change in a value of the secondary battery according to the elapse of time.

(3): In the above-described aspect (1) or (2), the provider provides a user of the vehicle with a usage method for limiting deterioration in the secondary battery.

(4): In any one of the above-described aspects (1) to (3), the provider provides a user of the vehicle with information about a timing when the secondary battery is sold.

(5): In any one of the above-described aspects (1) to (4), the provider provides the provision information to the vehicle at a prescribed timing.

(6): In any one of the above-described aspects (1) to (5), the analyzer analyzes the number of secondary batteries required for each region on the basis of a purchase request from the secondary-use-related user.

(7): According to an aspect of the present invention, there is provided an information processing method including: acquiring, by a computer, secondary battery information about a secondary battery transmitted from a vehicle equipped with the secondary battery storing electric power for traveling; analyzing, by the computer, value information of the secondary battery on the basis of the acquired secondary battery information and request information from a secondary-use-related user who uses the secondary battery; and providing, by the computer, provision information about a sale of the secondary battery on the basis of the analyzed value information of the secondary battery.

(8): According to an aspect of the present invention, there is provided a program for causing a computer to: acquire secondary battery information about a secondary battery transmitted from a vehicle equipped with the secondary battery storing electric power for traveling; analyze value information of the secondary battery on the basis of the acquired secondary battery information and request information from a secondary-use-related user who uses the secondary battery; and provide provision information about a sale of the secondary battery on the basis of the analyzed value information of the secondary battery.

Advantageous Effects of Invention

According to the above-described (1) to (8), it is possible to promote the distribution of secondary batteries for secondary use with a better state.

BRIEF DESCRIPTION OF DRAWINGS

FIG. 6 is a diagram for describing content of collected data 352.

FIG. 7 is a diagram for describing content of purchase request data 354.

FIG. 8 is a diagram for describing content of analysis data 356.

DESCRIPTION OF EMBODIMENTS

Hereinafter, embodiments of an information processing device, an information processing method, and a program of the present invention will be described with reference to the drawings. Although a vehicle is assumed to be an electric vehicle in the following description, the vehicle may be a hybrid vehicle or a fuel cell vehicle as long as it is a vehicle equipped with a secondary battery that supplies electric power for traveling of the vehicle.

Figure 1:
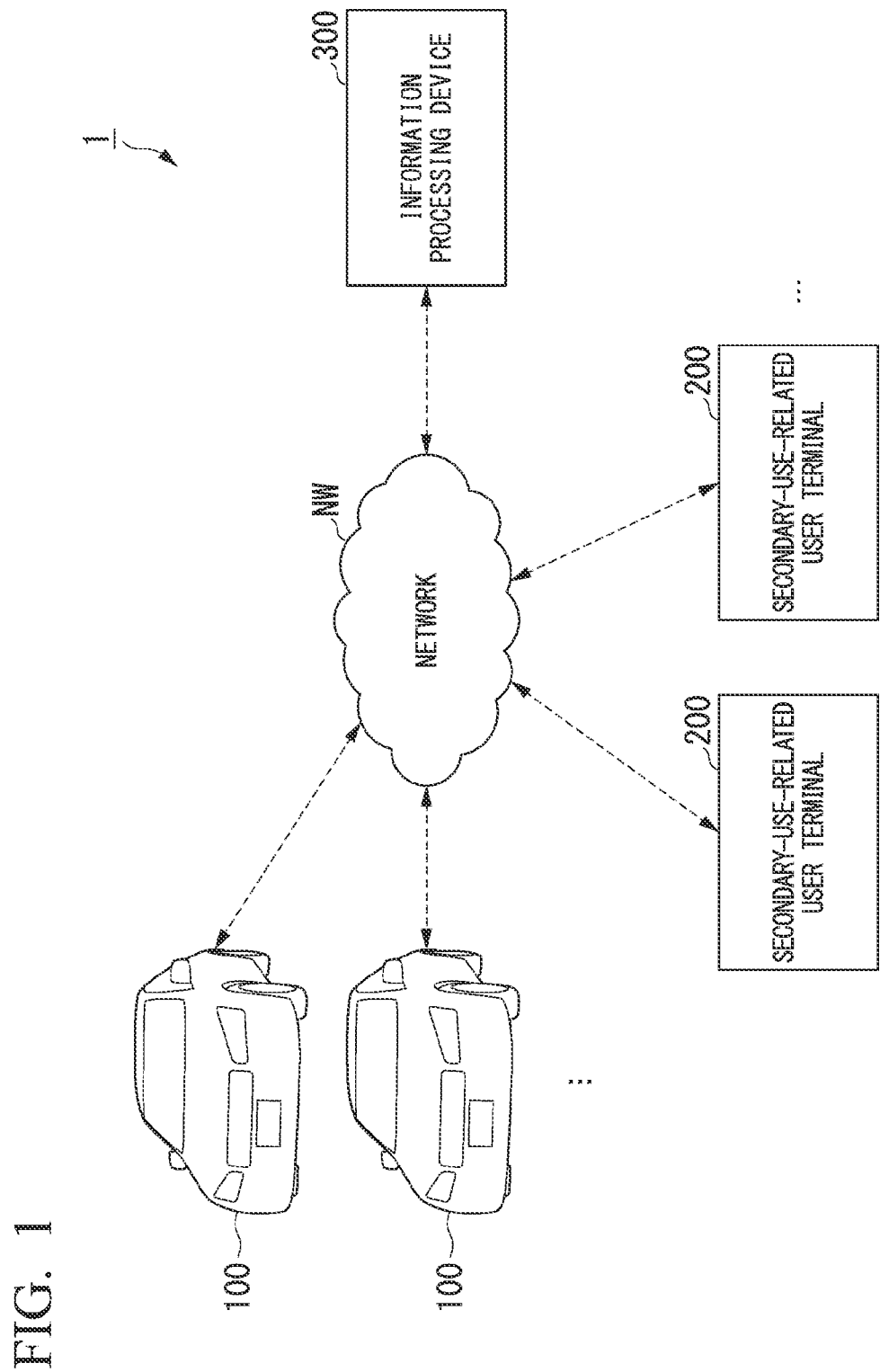
FIG. 1 is a diagram showing an example of a configuration of an information processing system 1 according to an embodiment.

FIG. 1 is a diagram showing an example of a configuration of an information processing system 1 according to the embodiment. The information processing system 1 includes one or more vehicles 100, one or more secondary-use-related user terminals 200, and an information processing device 300. The vehicles 100, the secondary-use-related user terminals 200, and the information processing device 300 communicate with other devices via a network NW. The network NW includes, for example, the Internet, a wide area network (WAN), a local area network (LAN), a provider device, a radio base station, and the like. In the information processing system 1, the information processing device 300 manages product information of a battery (a storage battery) mounted in the vehicle 100 and information about a use state thereof or the like (hereinafter referred to as battery data) and provides various types of information about the battery to the vehicle 100, the secondary-use-related user terminal 200, and the like. The secondary-use-related user terminal 200 is a terminal device used by a user who secondarily uses the battery 140. The secondary-use-related user includes, for example, a user who reuses a battery used in another vehicle by mounting the battery in his/her own vehicle, a seller who sells a used vehicle equipped with a battery that has been mounted in the vehicle 100 or sells the battery that has been mounted in the vehicle 100 as a battery (a used battery) for secondary use, a user who uses the battery 140 as a stationary battery in a facility such as a factory, or the like. The secondary-use-related user terminal 200 may be a terminal device installed at a prescribed position or may be a portable terminal device (for example, a portable terminal) such as a smartphone or a tablet terminal. Hereinafter, the functions of the vehicle 100, the secondary-use-related user terminal 200, and the information processing device 300 will be specifically described.

Vehicle 100

Figure 2:
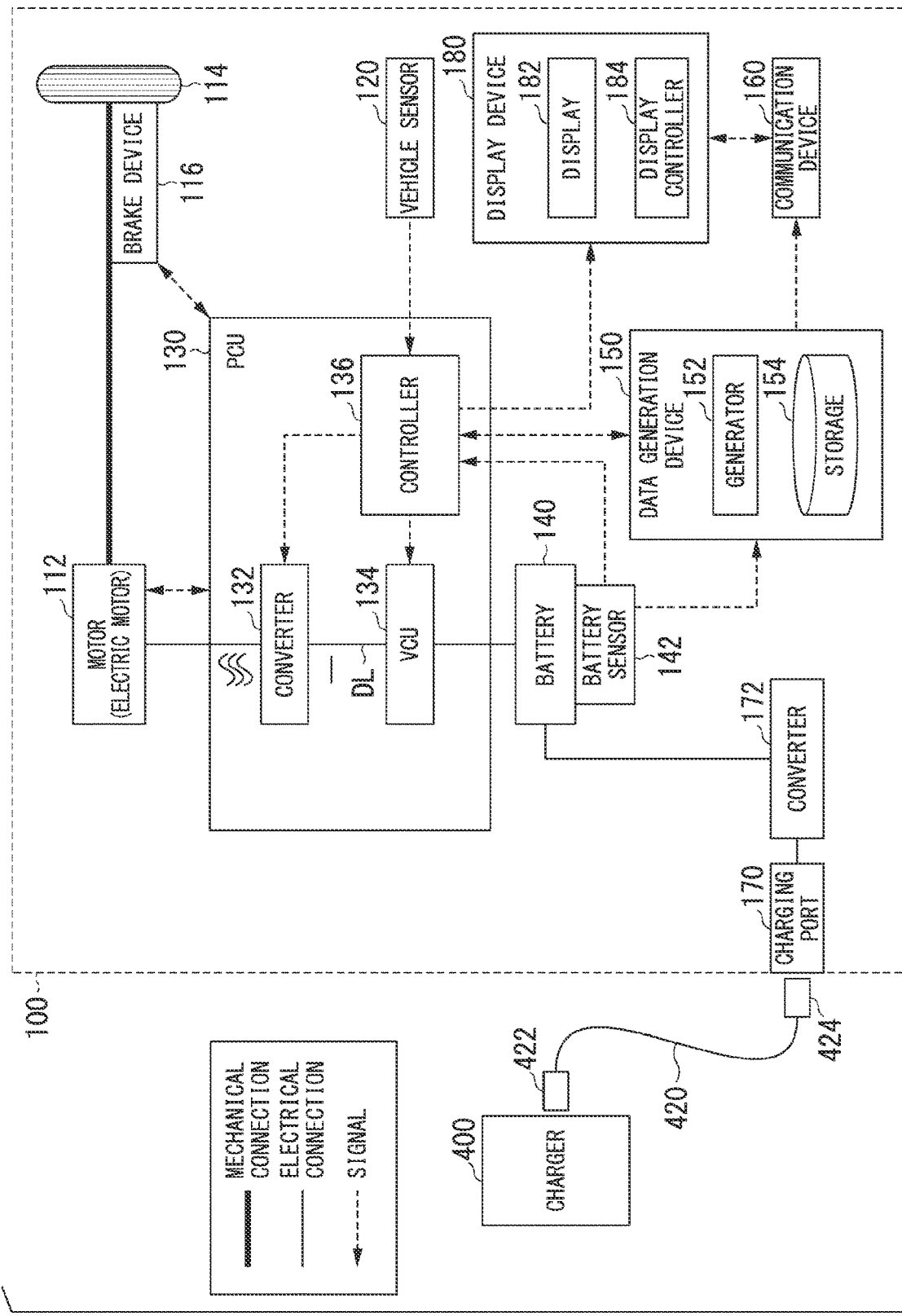
FIG. 2 is a diagram showing an example of a configuration of a vehicle 100.

FIG. 2 is a diagram showing an example of a configuration of the vehicle 100. As shown in FIG. 2, the vehicle 100 includes, for example, a motor 112, drive wheels 114, a brake device 116, a vehicle sensor 120, a power control unit (PCU) 130, a battery (a storage battery) 140, a battery sensor 142, a data generation device 150, a communication device 160, a charging port 170, a converter 172, and a display device 180.

The motor 112 is, for example, a three-phase AC motor. The rotor of the motor 112 is connected to the drive wheels 114. The motor 112 outputs motive power to the drive wheels 114 using, for example, the electric power supplied from the battery 140. Also, the motor 112 may generate electric power using kinetic energy of the vehicle when the vehicle is decelerated.

The brake device 116 includes, for example, a brake caliper, a cylinder that transfers hydraulic pressure to the brake caliper, and an electric motor that generates hydraulic pressure in the cylinder. The brake device 116 may include a mechanism that transfers hydraulic pressure generated by the operation of the brake pedal to the cylinder via a master cylinder as a backup. Also, the brake device 116 is not limited to the above-described configuration and may be an electronically controlled hydraulic brake device that transfers the hydraulic pressure of the master cylinder to the cylinder.

For example, the vehicle sensor 120 includes an accelerator opening degree sensor, a vehicle speed sensor, and a brake depression amount sensor. The accelerator opening degree sensor is attached to an accelerator pedal, which is an example of an operation element for receiving an acceleration instruction from a driver, detects an amount of operation of the accelerator pedal, and outputs the detected amount of operation as an accelerator opening degree to the controller 136. The vehicle speed sensor includes, for example, a wheel speed sensor and a speed calculator attached to each wheel and combines wheel speeds detected by wheel speed sensors to derive the speed of the vehicle (a vehicle speed) and outputs the derived speed to the controller 136 and the display device 180. The brake depression amount sensor is attached to the brake pedal, detects the amount of operation of the brake pedal, and outputs the detected amount of operation as an amount of brake depression to the controller 136. Also, the vehicle sensor 120 may include, for example, a yaw rate sensor that detects an angular velocity around the vertical axis of the vehicle 100 and a direction sensor that detects the direction of the vehicle 100.

The PCU 130 includes, for example, a converter 132, a voltage control unit (VCU) 134, and the controller 136. Also, a group of the above components is configured as the PCU 130 as only an example and these components may be arranged in a distributed form.

The converter 132 is, for example, an alternating current (AC)-direct current (DC) converter. A DC side terminal of the converter 132 is connected to a DC link DL. The battery 140 is connected to the DC link DL via the VCU 134. The converter 132 converts an AC generated by the motor 12 into a DC and outputs the DC to the DC link DL.

The VCU 134 controls the charging and discharging of the battery on the basis of control information from the controller 136. The VCU 134 performs discharging control for outputting the electric power supplied from the battery 140 to the DC link DL according to the control of the controller 136. Also, the VCU 134 adjusts a voltage of the DC link DL on the basis of the control information from the battery/VCU controller and controls the charging of the battery 140 so that a prescribed SOC is provided.

The controller 136 includes, for example, a motor controller, a brake controller, and a battery/VCU controller. The motor controller, the brake controller, and the battery/VCU controller may be replaced with separate control devices (for example, control devices such as a motor ECU, a brake ECU, and a battery ECU).

The motor controller controls the motor 112 on the basis of an output of the vehicle sensor 120. The brake controller controls the brake device 116 on the basis of the output of the vehicle sensor 120. The battery/VCU controller derives a state of charge (SOC) on the basis of an output (for example, a voltage value, a current value, or a temperature) of the battery sensor 142 attached to the battery 140.

Specifically, the battery/VCU controller acquires the remaining capacity of energy with which the battery 140 is charged (hereinafter simply referred to as "remaining capacity") on the basis of a magnitude of a voltage value of the battery 140. Also, the battery/VCU controller may acquire the remaining capacity by integrating amounts of electric current stored in the battery 140 at the time of charging and obtaining an amount of electric current output at the time of discharging. Also, the battery/VCU controller may pre-store a database of discharging characteristics and temperature characteristics of the battery 140 in a storage (not shown) or the like, collate a voltage value, a current value, and a temperature measured from the battery sensor 142 with identical items in the database, and acquire the remaining capacity associated with the voltage value, the current value, and the temperature. Also, the battery/VCU controller acquires a full charge capacity on the basis of the voltage value when an amount of change in the voltage value is less than or equal to a prescribed amount even after a prescribed time period elapses in the charged state. Also, the battery/VCU controller may estimate a capacity changed (specifically, reduced) on the basis of the number of times of charging, the temperature, or the like as a full charge capacity with respect to an initial capacity obtained from the data generation device 150 to be described below. The battery/VCU controller derives the SOC by dividing the remaining capacity by the full charge capacity (SOC= (remaining capacity/full charge capacity)×100[%]).

Also, the battery/VCU controller outputs control information for controlling the charging of the battery 140 to the VCU 134 on the basis of the derived SOC. For example, the battery/VCU controller outputs control information for performing control so that a charging process is performed until a prescribed SOC (a set value or a fixed value) is reached at the time of charging to the VCU 134. Also, the battery/VCU controller may be configured to generate notification information for prompting an occupant (a vehicle user) of the vehicle 100 to charge the battery 140 in a charging facility 400 or the like when the derived SOC becomes less than or equal to a threshold value and output the generated notification information to the display device 180. Also, the battery/VCU controller outputs charging execution information such as the remaining capacity and an SOC to the data generation device 150.

The battery 140 is, for example, a secondary battery such as a lithium-ion battery. The battery 140 stores, for example, electric power for traveling. Specifically, the battery 140 stores electric power supplied from the charging facility 400 outside the vehicle 100 and electric power (regenerative electric power) generated by the motor 112. Also, the battery 140 is discharged for the vehicle 100 for traveling or is discharged for supplying electric power to in-vehicle equipment (for example, the communication device 160 or a display device 180) or the like. Although it is assumed that one battery 140 is simply mounted in the vehicle 100 in the following description, the battery 140 may be a battery module including a plurality of battery packs. In this case, each battery bag can be sold.

The battery sensor 142 includes, for example, a voltage sensor that detects a voltage value of the battery 140, a current sensor that detects a current value of the battery 140, and a temperature sensor that detects a temperature of the battery 140. The battery sensor 142 outputs the voltage value, the current value, and the temperature detected from the sensors to the controller 136 and the data generation device 150.

The data generation device 150 includes, for example, a generator 152 and a storage 154. The storage 154 stores, for example, initial information about the battery 140. The initial information is, for example, data stored when the battery 140 is mounted in the vehicle 100. The initial information includes, for example, a product name, a model, a manufacturer name, a manufacturing date, a use start date, a scheduled use end date, an initial capacity, an initial voltage, and the like of the battery 140. The use start date may be the manufacturing date of the battery 140 or a date when the battery 140 has been mounted in the vehicle 100. As the scheduled use end date, a date after a prescribed period from the use start date is set. The prescribed period may be a fixed period or a period set according to the performance of the battery 140 or a warranty period thereof. The initial capacity is an initial full charge capacity (for example, at the time of manufacturing or at the start of use). Also, the initial voltage is an initial voltage value. The initial information is fixed information that does not change.

The generator 152 adds 1 to the number of times of charging at a timing when charging is completed after the start of charging on the basis of the charging execution information output by the controller 136. Information about the number of times of charging is stored in the storage 154. The generator 152 generates battery data (an example of secondary battery information) including the initial information stored in the storage 154, the number of times of charging, and the charging execution information. Also, the generator 152 may include the state rank of the battery 140 (an example of the state information) in the battery data. The state rank is derived on the basis of, for example, a state of health (SOH) (a battery deterioration state). The SOH is calculated, for example, by dividing the full charge capacity by the initial capacity (SOH=(full charge capacity/initial capacity)×100[%]). In the embodiment, when the SOH value is larger, a rank indicating a better battery state (a higher rank) is assigned. Also, the state rank may be an SOH. Also, the generator 152 may cause information about the next vehicle inspection date of the vehicle 100 (an inspection date of the vehicle 100 determined by the national government or the like) to be included in the battery data. The generator 152 may cause the generated battery data to be transmitted to the information processing device 300 using the communication device 160 according to a timing when the battery data is generated or updated, a timing when the battery 140 is charged, or a prescribed interval. Also, the generator 152 may cause the storage 154 to store the battery data.

The communication device 160 includes a wireless module for connecting to a cellular network or a Wi-Fi network. The communication device 160 transmits, for example, information output by the controller 136, the data generation device 150, the display device 180, and the like to the information processing device 300 via the network NW. Also, the communication device 160 receives the information transmitted by the information processing device 300 via the network NW. The communication device 160 outputs the received information to the display device 180 or the like.

The charging port 170 is provided oriented toward outside of the vehicle body of the vehicle 100. The charging port 170 is connected to the charging facility 400 via a charging cable 420. The charging facility 400 is provided, for example, in a parking lot of a home or a commercial facility or the like. The charging cable 420 includes a first plug 422 and a second plug 424. The first plug 422 is connected to the charging facility 400 and the second plug 424 is connected to the charging port 170. The electric power supplied from the charging facility 400 is supplied to the charging port 170 via the charging cable 420.

Also, the charging cable 420 includes a signal cable attached to the power cable. The signal cable mediates communication between the vehicle 100 and the charging facility 400.

The converter 172 is provided between the charging port 170 and the battery 140. The converter 172 converts an AC introduced from the charging facility 400 via the charging port 170 into a DC. The converter 172 outputs the DC after the conversion to the battery 140. Thereby, the battery 140 is charged with the electric power from the charging facility 400. Also, the charging of the battery 140 is controlled by the VCU 134 so that the charging is completed in a prescribed SOC.

The display device 180 includes, for example, a display 182 and a display controller 184. The display 182 is, for example, a liquid crystal display (LCD), an organic electro luminescence (EL) display device, or the like. Also, the display 182 may have a function as an operation element that receives an input operation by contact with the operator's finger or the like, such as a touch panel. Also, the display 182 is, for example, a multi-information display (MID) and displays information according to the control of the display controller 184. Also, the display 182 is provided at a prescribed position in the vehicle cabin of the vehicle 100.

Figure 3:
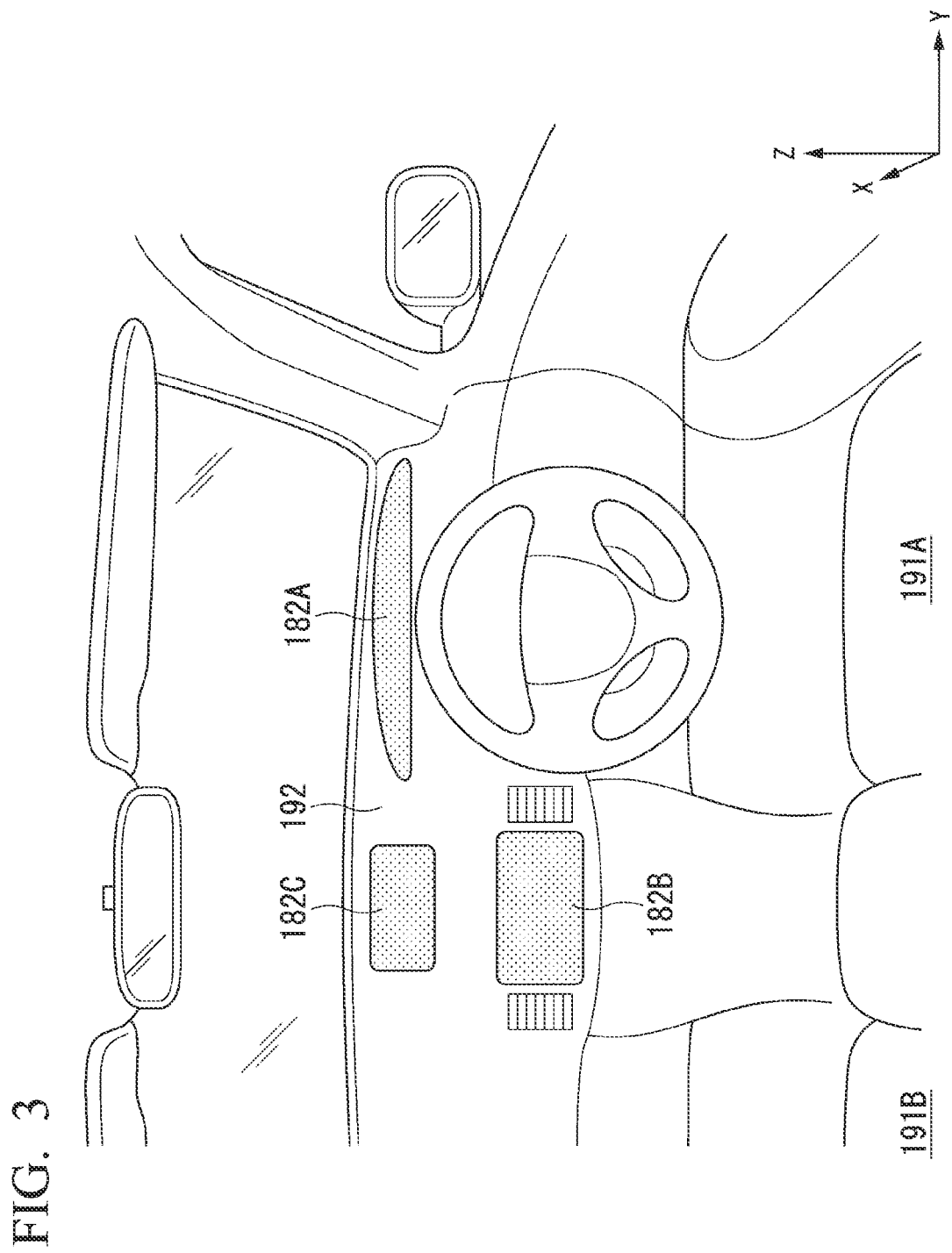
FIG. 3 is a diagram for describing a position of a display 182 provided in a vehicle cabin of the vehicle 100.

FIG. 3 is a diagram for describing a position of the display 182 provided in the vehicle cabin of the vehicle 100. In the example of FIG. 3, a first display 182A, a second display 182B, and a third display 182C are provided as the display 182.

The first display 182A is arranged on, for example, a meter panel including an instrument such as a vehicle speed meter provided on the instrument panel 192 in front of a driver's seat 191A and a passenger seat 191B. For example, the second display 182B and the third display 182C are arranged near the left front of the driver's seat 191A in the instrument panel 192 within the vehicle cabin. For example, the second display 182B is arranged on the central portion of the instrument panel 192. The third display 182C is arranged above the second display 182B on the instrument panel 192. The second display 182B is arranged at a position that is less visible to the driver of the vehicle 100 during driving or surrounding monitoring than the third display 182C and does not interfere with driving. Compared with the second display 182B, the third display 182C is arranged at a position easily allowing visual recognition by the driver of the vehicle 100 (for example, a position allowing visual recognition by the driver with a smaller movement of the line of sight).

On each of the first display 182A, the second display 182B, and the third display 182C, information detected by various types of instruments mounted in the vehicle 100 and content such as an image generated by a navigation device (not shown) mounted in the vehicle 100, a TV program, and a video which is stored in a DVD or downloaded is displayed. Also, information obtained by the controller 136 and the data generation device 150, information transmitted from the information processing device 300 (for example, provision information), and the like are displayed on the displays. The display controller 184 causes the displays to display the various types of information described above. Also, the display controller 184 performs control so that display content, which is displayed on each display, can be appropriately replaced on the basis of an instruction of the vehicle user or a traveling situation of the vehicle. Also, the display controller 184 may cause the speaker (not shown) included in the display device 180 to output speech corresponding to the display content. Details of the content displayed on the display will be described below.

Secondary-Use-Related User Terminal 200

Figure 4:
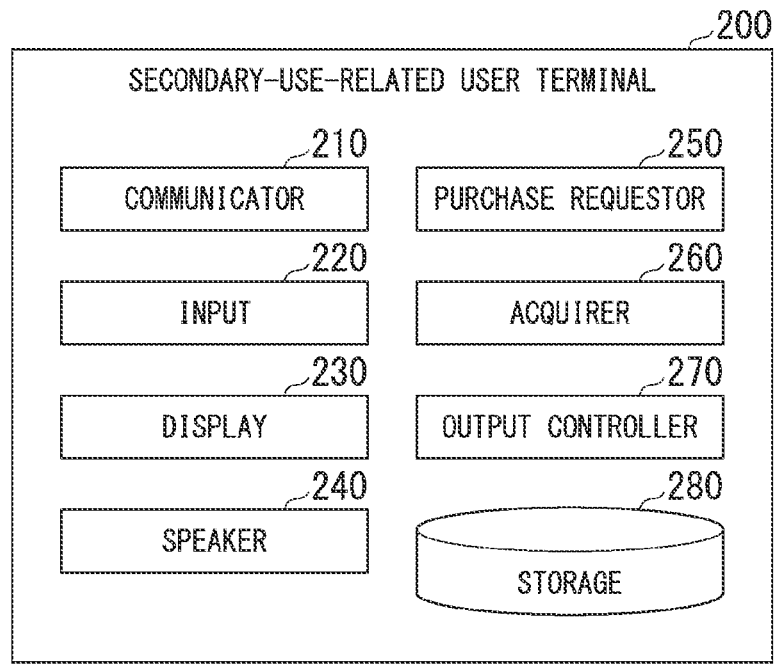
FIG. 4 is a diagram showing an example of a functional configuration of a secondary-use-related user terminal 200.

FIG. 4 is a diagram showing an example of a functional configuration of the secondary-use-related user terminal 200. The secondary-use-related user terminal 200 includes, for example, a communicator 310, an input 220, a display 230, a speaker 240, a purchase requestor 250, an acquirer 260, an output controller 270, and a storage 280. The purchase requestor 250, the acquirer 260, and the output controller 270 are implemented by, for example, a hardware processor such as a central processing unit (CPU) executing a program (software). Also, some or all of the above components may be implemented by hardware (including a circuit; circuitry) such as a large-scale integration (LSI) circuit, an application specific integrated circuit (ASIC), a field-programmable gate array (FPGA), or a graphics processing unit (GPU) or may be implemented by software and hardware in cooperation. The above program may be pre-stored in a storage device (a storage device including a non-transitory storage medium, for example, the storage 280) such as hard disk drive (HDD) or a flash memory of the secondary-use-related user terminal 200 or may be stored in a removable storage medium such as a DVD, a CD-ROM, or a memory card and installed in the storage device of the secondary-use-related user terminal 200 when the storage medium (the non-transitory storage medium) is mounted in a drive device, a card slot, or the like.

The communicator 310 communicates with the information processing device 300 and other external devices using, for example, the network NW.

For example, the input 220 receives an input of a user U1 by operating various types of keys or buttons, or the like. The display 230 is, for example, an LCD, an organic EL display device, or the like. The input 220 may be configured integrally with the display 230 as a touch panel. The display 230 displays information necessary for using the secondary-use-related user terminal 200 according to the control of the output controller 270. For example, the speaker 240 outputs prescribed speech according to the control of the output controller 270.

The purchase requestor 250 acquires request information for the secondary-use-related user to purchase the battery and transmits the acquired request information to the information processing device 300. Batteries for which purchase requests are made include new batteries and used batteries (batteries for secondary use). Hereinafter, a case in which a used battery is purchased will be described in particular. The request information includes, for example, values of a type (a product name, a model, or the like), a state (for example, a state rank), a quantity, a purchase price of the battery to be purchased, and the like. For example, the purchase requestor 250 causes the display 230 to display an input image for inputting the request information according to the control of the output controller 270 and acquires the request information on the basis of the information input by the input 220.

The acquirer 260 acquires a response to the request information from the information processing device 300, causes the acquired response information to be displayed on the display 230 according to the control of the output controller 270, and causes speech corresponding to the response information to be output from the speaker 240. Also, the acquirer 260 may cause the storage 280 to store the response information acquired from the information processing device 300.

The output controller 270 controls content to be displayed on the display 230 and content of the speech to be output by the speaker 240. Also, the output controller 270 may cause various types of information necessary for using the secondary-use-related user terminal 200 to be output from the display 230 and the speaker 240.

The storage 280 is implemented by, for example, an HDD, a flash memory, an EEPROM, a ROM, a RAM, or the like. The storage 280 stores, for example, request information, a program, and various types of other information.

Information Processing Device 300

Figure 5:
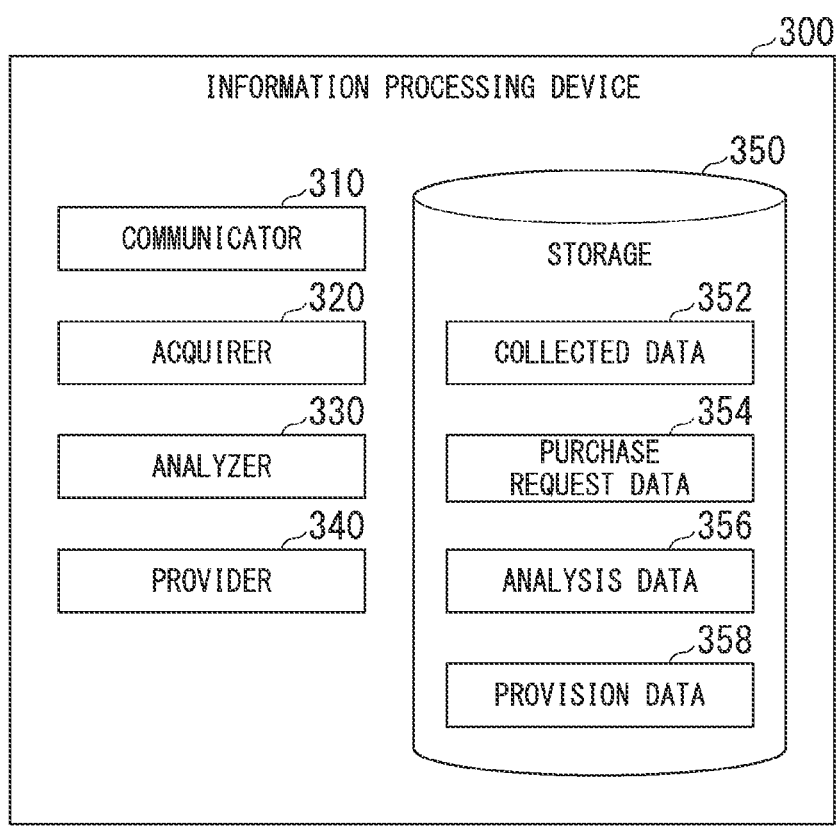
FIG. 5 is a diagram showing an example of a functional configuration of an information processing device 300.

FIG. 5 is a diagram showing an example of a functional configuration of the information processing device 300. The information processing device 300 includes, for example, a communicator 310, an acquirer 320, an analyzer 330, a provider 340, and a storage 350. The analyzer 330 and the provider 340 are implemented by, for example, a hardware processor such as a CPU executing a program (software). Some or all of the above components may be implemented by hardware (including a circuit; circuitry) such as an LSI circuit, an ASIC, an FPGA, or a GPU or may be implemented by software and hardware in cooperation. The program may be pre-stored in a storage device (a non-transitory storage medium) such as an HDD or a flash memory or may be stored in a removable storage medium (the non-transitory storage medium) such as a DVD or a CD-ROM and installed in the storage device when the storage medium is mounted in a drive device. The storage 350 is implemented by the storage device described above.

The communicator 310 receives various types of information transmitted by one or more vehicles 100 or one or more secondary-use-related user terminals 200 via the network NW. Also, the communicator 310 transmits an analysis result of the analyzer 330 and provision data (an example of provision information) generated by the provider 340 to the vehicle 100 and the secondary-use-related user terminal 200.

The acquirer 320 acquires the battery data transmitted by each of the one or more vehicles 100, collects the acquired battery data to generate collected data 352, and causes the storage 350 to store the generated collected data 352.

FIG. 6 is a diagram for describing content of the collected data 352. In the collected data 352, a vehicle ID, which is identification information for identifying the vehicle 100, is associated with position information, acquisition date and time information, a battery ID, which is identification information for identifying the battery 140, an SOC [%], the remaining capacity [kWh], a full charge capacity [kWh], the number of times of charging [times], battery information, and a vehicle inspection date. The battery information includes, for example, initial information, a state rank, and the like. The position information is, for example, position information (for example, latitude and longitude) of the vehicle that has transmitted the battery data. The acquisition date and time information is about a date and time when the vehicle 100 has transmitted the battery data or when the communicator 310 has received the battery data.

Also, the acquirer 320 acquires the battery request information transmitted from the secondary-use-related user terminal 200 and causes the storage 350 to store the acquired request information as purchase request data 354. FIG. 7 is a diagram for describing the content of the purchase request data 354. In the purchase request data 354, for example, a terminal ID, which is identification information for identifying the secondary-use-related user terminal 200, is associated with position information, request date and time information, battery information, a required quantity [pieces], and a purchase price [yen/piece]. The position information in FIG. 7 is, for example, information about a position (a region) where the purchased battery is used. The position information is, for example, information about a position of the factory where the battery is installed, an address of an owner of the vehicle, or a region thereof. The request date and time information is about, for example, a date and time when the vehicle 100 has transmitted the battery data or when the communicator 310 has received the request information. The required battery information includes, for example, information about a type and a state of the battery desired to be purchased. The required quantity is the number of batteries desired to be purchased. The purchase price is a desired purchase price per battery. The acquirer 320 generates the purchase request data 354 in which the request information is associated with the terminal ID of the secondary-use-related user terminal 200 that has transmitted the request information.

The analyzer 330 analyzes value information of the battery using the collected data 352 and/or the purchase request data 354 acquired by the acquirer 320 and generates analysis data 356. FIG. 8 is a diagram for describing the content of the analysis data 356. In the analysis data 356, for example, a region ID, which is identification information for identifying the region, is associated with a state rank for identifying a state of the battery, a required quantity [pieces], a total capacity [kWh], and an average purchase price [yen/piece].

The analyzer 330 performs a statistical process for request information for each prescribed region on the basis of the position information included in the purchase request data 354. Also, the analyzer 330 analyzes value information of the battery on the basis of how many batteries of which state rank are insufficient in the associated region for classified request information. For example, in the example of FIG. 8, the analyzer 330 can sell a battery of a state rank "R3" in a region ID "A1" at a price higher than the average purchase price at present because the required quantity of the state rank R3 is large in the region A1 and makes value evaluation indicating that a decrease in the purchase price will be small in the future. Also, the analyzer 330 may estimate a future degree of deterioration of the battery for each vehicle or each battery included in the collected data 352 or analyze a price change based on the future degree of deterioration. Also, the analyzer 330 may analyze how the battery can be used to limit the deterioration of the battery from a previous change in the degree of deterioration of the battery.

Also, the analyzer 330 may analyze current and/or future values of the battery on the basis of a balance (a ratio) between supply and demand based on the collected data 352 and the purchase request data 354 and the like. Also, an analysis method in the analyzer 330 is not limited to this and more appropriate analysis may be performed using a prescribed statistical process using regression analysis, machine learning, or the like based on history information of past values, and artificial intelligence (AI) technology, or the like.

The provider 340 transmits a statistical result and value information of the battery analyzed by the analyzer 330 to the vehicle 100 and the secondary-use-related user terminal 200 via the communicator 310. For example, the provider 340 generates information about a state and a market value of the battery 140, information about how to use the battery 140 so that deterioration is limited, information about a timing of selling the battery 140, and the like for the user of the vehicle 100 and transmits the generated information (provision data) to the vehicle 100. Also, when there is an instruction for selling the battery 140 from the vehicle 100, the provider 340 may provide information about a battery to the secondary-use-related user terminal 200 requesting the battery associated with the instruction.

Hereinafter, details of the content provided from the provider 340 and displayed by the display device 180 of the vehicle 100 will be described. Also, although an image displayed in at least a part of a display region of the first display 182A will be described below, the same or similar information may be displayed in other displays.

The provider 340 generates an image including information about the state of the battery 140 of the vehicle 100 and transmits the generated image to the vehicle 100. The vehicle 100 displays an image provided from the information processing device 300.

Figure 9:
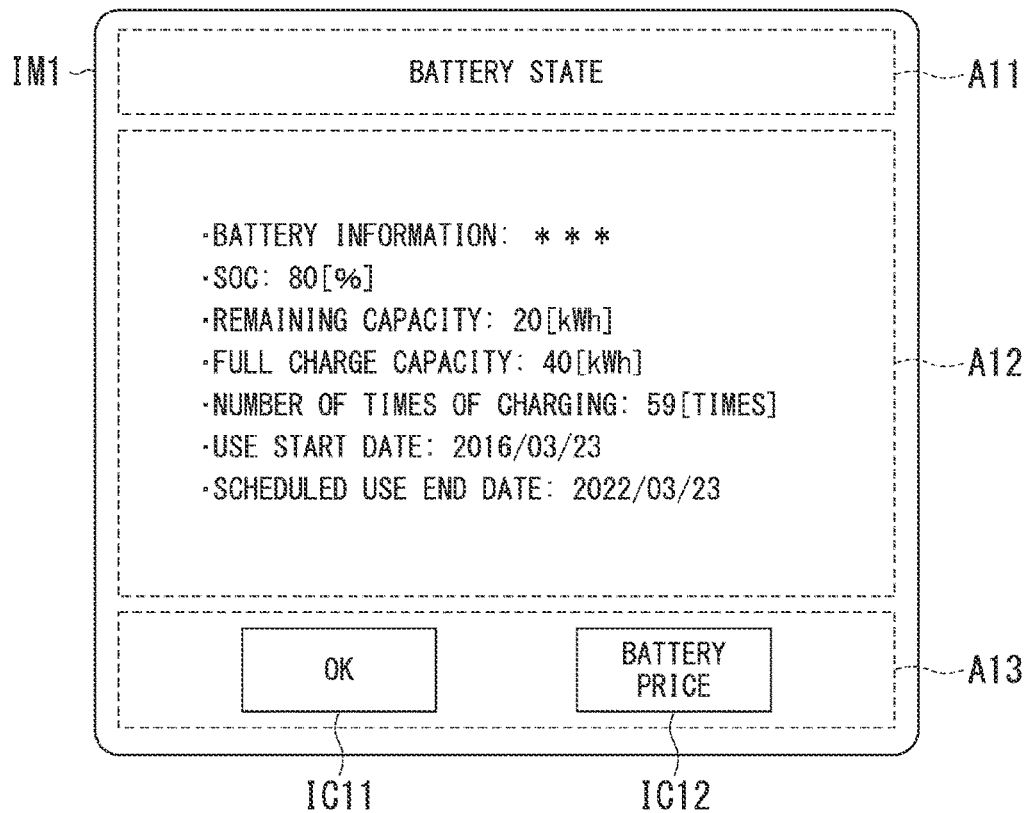
FIG. 9 is a diagram showing an example of an image IM1 including a battery state.

FIG. 9 is a diagram showing an example of an image IM1 including the battery state. The image IM1 includes a heading display region A11, a provision information display region A12, and a graphical user interface (GUI) switch display region A13. In the example of FIG. 9, the text information "battery state" is displayed in the heading display region A11.

In the provision information display region A12, the battery data generated by the generator 152 or the collected data corresponding to the vehicle 100 provided by the information provider is displayed. In the example of FIG. 9, for example, battery information, an SOC [%], the remaining capacity [kWh], a full charge capacity [kWh], the number of times of charging [times], a use start date, and a scheduled use end date are displayed in the provision information display region A12. Also, the above-described display content may be acquired from the battery data generated by the data generation device 150.

In the GUI switch display region A13, for example, icons for receiving an instruction from the user are displayed. The icons include, for example, an icon IC11 on which the text "OK" is written and an icon IC12 on which the text "battery price" are written. When the icon IC11 or the icon IC12 has been selected by the user, the display controller 184 executes processes corresponding to the selected icons IC11 and IC12.

For example, when the icon IC11 has been selected, the display controller 184 ends the display of the image IM1. Also, when the icon IC12 has been selected, the display controller 184 causes the first display 182A to display information about the provision data provided by the information processing device 300.

Figure 10:
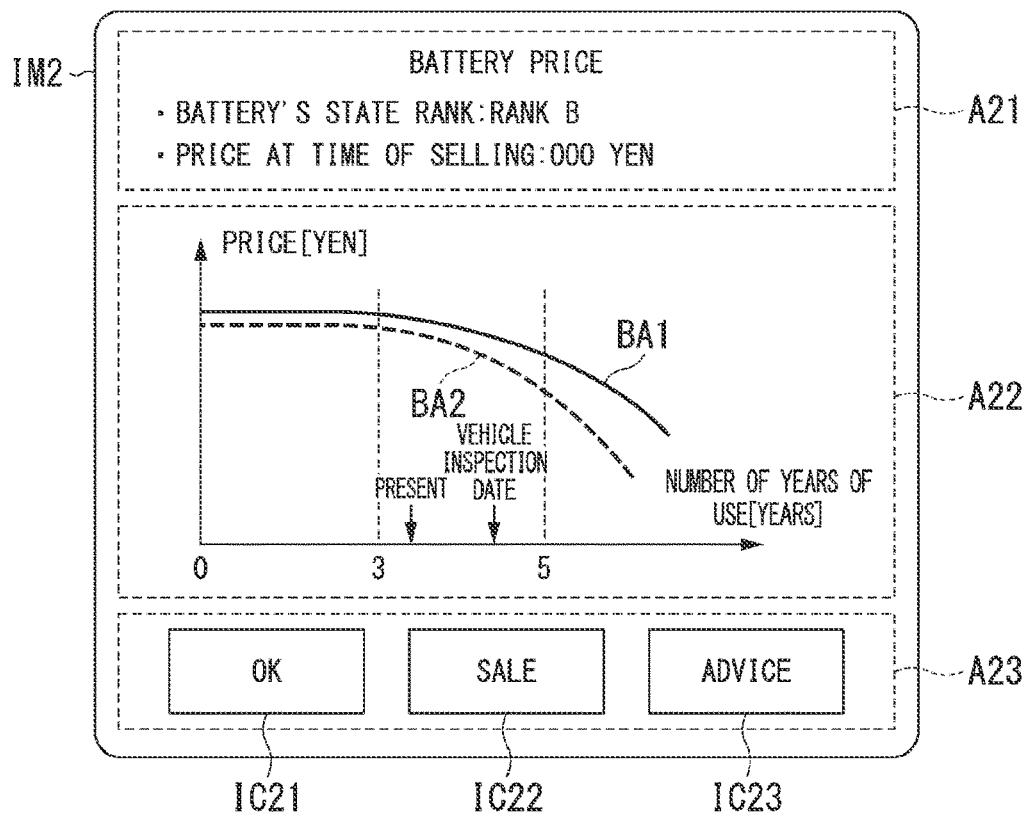
FIG. 10 is a diagram showing an example of an image IM2 including information about a battery price.

FIG. 10 is a diagram showing an example of an image IM2 including information about the battery price. The image IM2 includes a heading display region A21, a provision information display region A22, and a GUI switch display region A23. In the example of FIG. 10, the text information "battery price", the state rank of the battery 140 included in the provision data, and the price "OOO yen" at the time of sale at the present time are displayed in the heading display region A21. The state rank may be acquired from the battery data generated by the data generation device 150. Also, the price is a price analyzed by the analyzer on the basis of the average purchase price and the required quantity in the region corresponding to the position information of the vehicle.

In the provision information display region A22, a graph showing a relationship between the years of use [years] of the price of the battery 140 and the price [yen] included in the provision data acquired by the information processing device 300 is displayed. In the graph of the provision information display region A22, a line BA1 indicates an upper limit of a market price of a battery which is the same as the battery 140 and a line BA2 indicates a lower limit of the market price of the battery which is the same as the battery 140. Also, the graph may indicate information about the current number of years of use of the battery 140 and a vehicle inspection date. For example, the current number of years of use or a position of the next vehicle inspection date is plotted on the axis representing the number of years of use in the provision information display region A22. By providing the above information to the occupants, it is possible to more appropriately provide the vehicle user with not only the current price of the battery 140 but also the change in the price over time. Also, it is possible to improve the motivation to perform the sale of the battery (including replacement thereof) by providing the vehicle user with information such as the vehicle inspection date.

In the GUI switch display region A23, for example, icons for receiving an instruction from the user are displayed. The icons include, for example, an icon IC21 on which the text "OK" is written, an icon IC22 on which the text "sale" is written, and an icon IC23 on which the text "advice" is written. When the icons IC21 to IC23 have been selected by the user, the display controller 184 executes processes corresponding to the selected icons IC21 to IC23.

For example, when the icon IC21 has been selected, the display controller 184 ends the display of the image IM2. Also, when the icon IC22 has been selected, the display controller 184 transmits information indicating that the user intends to sell the battery 140 to the information processing device 300. Also, when the icon IC21 has been selected, the display controller 184 causes the first display 182A to display an image IM3 including information about advice on use for limiting deterioration of the battery obtained from the information processing device 300.

Figure 11:
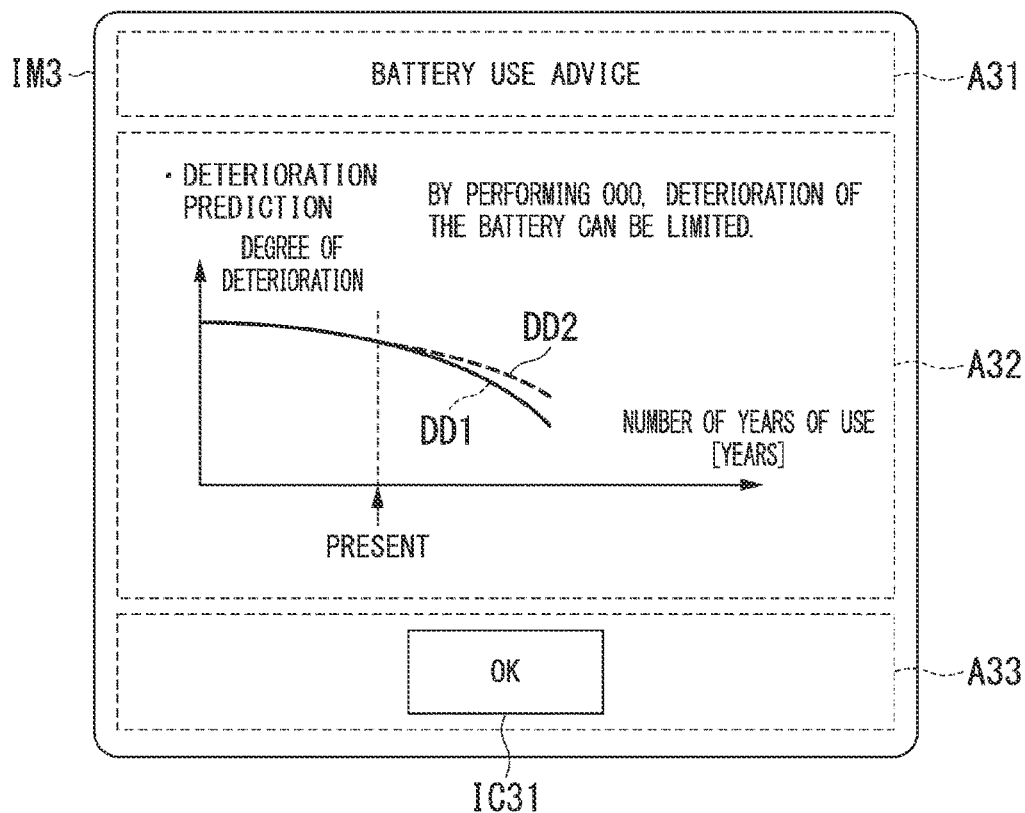
FIG. 11 is a diagram showing an example of an image IM3 including information about battery use advice.

FIG. 11 is a diagram showing an example of the image IM3 including information about battery use advice. The image IM3 includes a heading display region A31, an advice information display region A32, and a GUI switch display region A33. In the example of FIG. 11, text information such as "battery use advice" is displayed in the heading display region A31.

In the advice information display region A32, a graph related to deterioration prediction showing a relationship between the number of years of use [years] of the price of the battery 140 and a degree of deterioration and information related to the advice for future use of the battery included in the provision data acquired by the information processing device 300 are displayed. In the graph, a line DD1 indicates deterioration prediction when the vehicle user continues the current use state of the battery 140 and a line DD2 indicates deterioration prediction when the advice for future use of the battery is executed. In the advice information display region A32, text information such as "By performing OOO, deterioration of the battery can be limited." is displayed as the advice for future use of the battery. By advising the user on the usage method for limiting deterioration in this way, it is possible to improve the usage method of the battery of the user and it is possible to promote the improvement of the value of the battery to be sold.

In the GUI switch display region A33, for example, icons for receiving an instruction from the user are displayed. The icons include, for example, an icon IC31 on which the text "OK" are written. The display controller 184 ends the display of the image IM3 when the icon IC31 has been selected by the user. In this case, the display controller 184 may cause the image IM2 to be displayed again.

Also, when an icon IC23 on which the text "advice" is written has been selected in the image IM2, the display controller 184 may cause the first display 182A to display an image related to advice on a battery sale period instead of (or in addition to) advice on the usage method of the battery 140.

Figure 12:
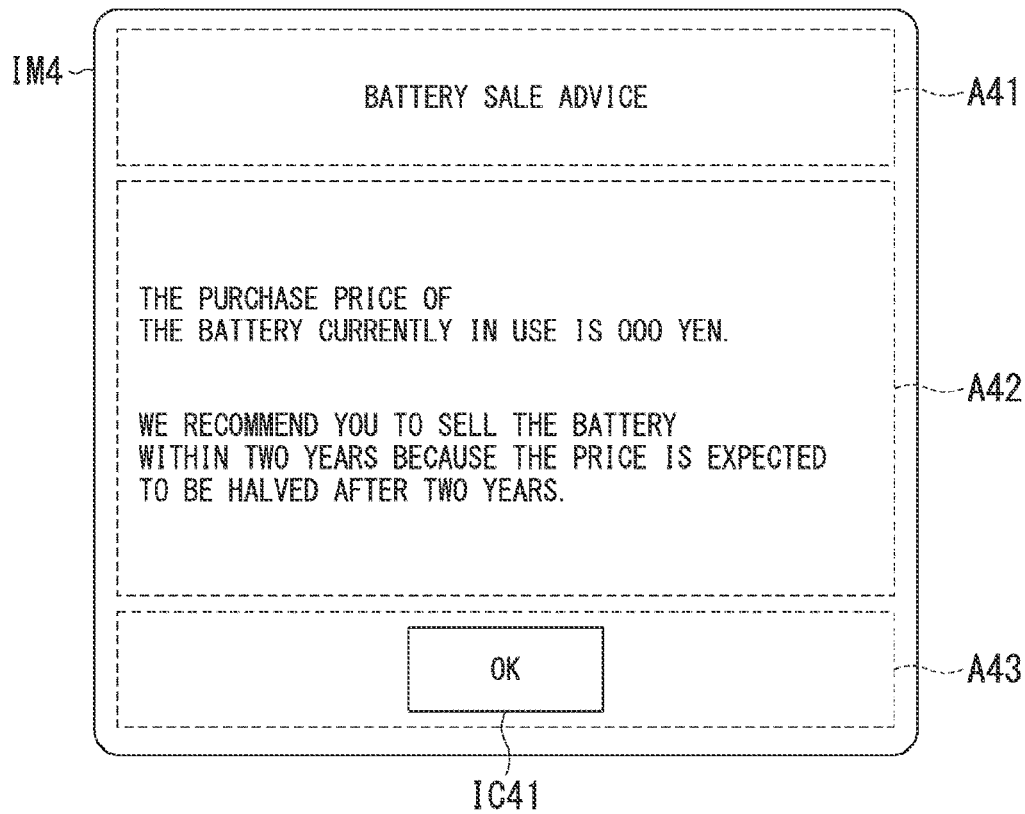
FIG. 12 is a diagram showing an example of an image IM4 including information about battery sale advice.

FIG. 12 is a diagram showing an example of an image IM4 including information about battery sale advice. The image IM4 includes a heading display region A41, an advice information display region A42, and a GUI switch display region A43. In the example of FIG. 12, text information such as "battery sale advice" is displayed in the heading display region A41.

In the advice information display region A42, information about the sale advice acquired by the information processing device 300 is displayed. In the example of FIG. 12, in the advice information display region A42, text information such as "The purchase price of the battery currently in use is OOO yen." and "We recommend you to sell the battery within two years because the price is expected to be halved after two years." is displayed. Thereby, the user can more appropriately ascertain a timing when the battery 140 is sold.

In the GUI switch display region A43, for example, icons for receiving an instruction from the user are displayed. The icons include, for example, the icon IC41 on which the text "OK" are written. The display controller 184 ends the display of the image IM4 when the icon IC41 has been selected by the user. In this case, the display controller 184 may cause the image IM2 to be displayed again.

The above-described images IM1 to IM4 are provided to the vehicle 100 at a prescribed timing by the provider 340. For example, the prescribed timing is a prescribed interval or a timing of an instruction by the vehicle 100. For example, the display controller 184 may cause the image IM1 to be constantly displayed in a part of the display region of the display when the vehicle 100 is activated (when the ignition is turned on) and the above-described images IM1 to IM4 may be displayed on a part of the operated display when the vehicle 100 is stopped or when the vehicle user has operated any one of the first to third displays 182A to 182C. Also, the display controller 184 may perform control so that, when the vehicle 100 is traveling, the second display 182B is displayed without interfering with the surrounding monitoring and driving of the vehicle user (particularly, the driver). Also, the display controller 184 may cause a part or all of the above-described information about the images IM1 to IM4 to be switched and displayed at prescribed time intervals or may cause one or more screens to display a part or all of the above-described information about the images IM1 to IM4 at the same time. Also, the display controller 184 may select the icon IC of each image described above, input speech from the vehicle user, and perform an image switching or instruction process or the like on the basis of a result of analyzing the input speech.

Processing Sequence

Figure 13:
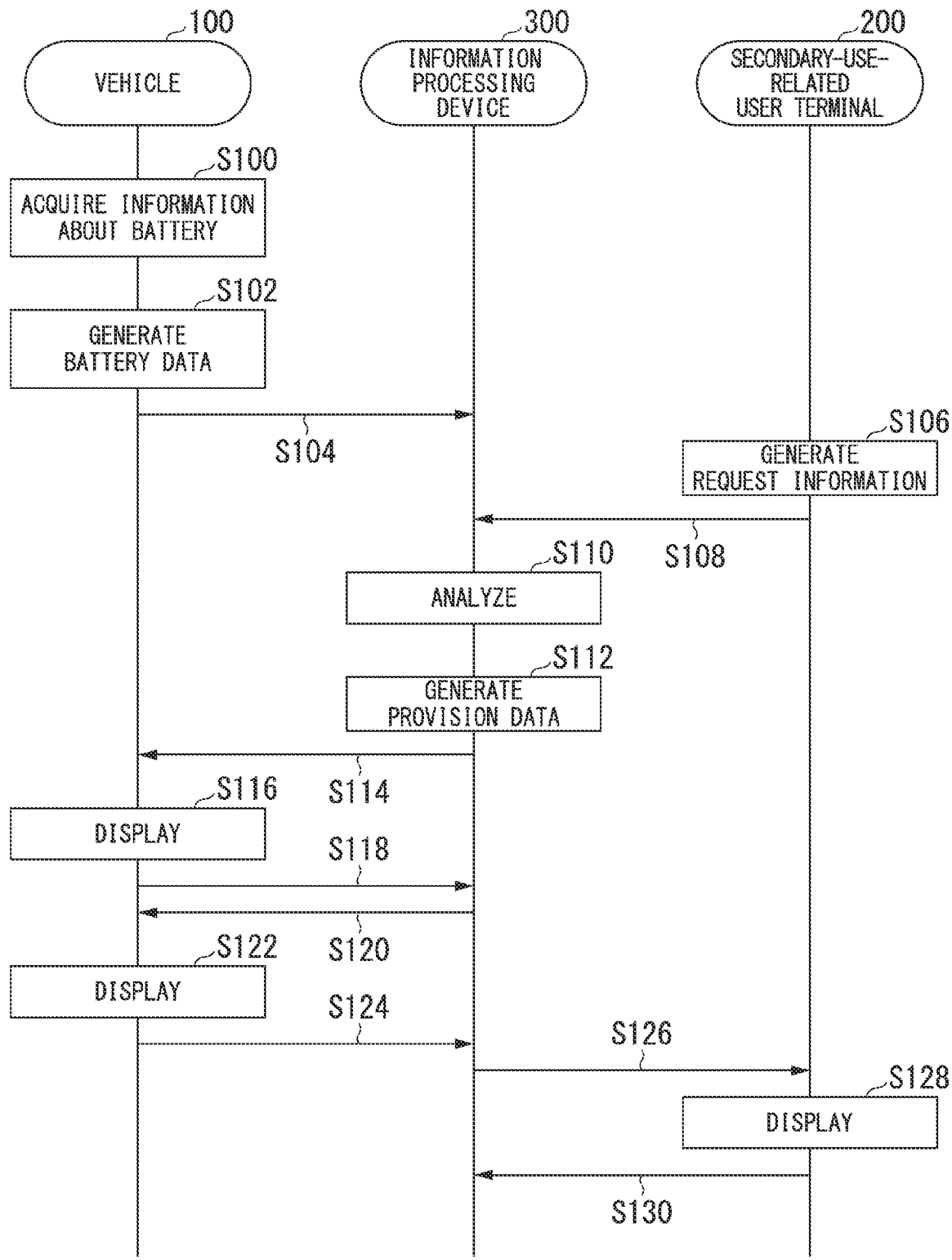
FIG. 13 is a sequence showing an example of a process executed by the information processing system 1 in the embodiment.

FIG. 13 is a sequence showing an example of a process executed by the information processing system 1 in the embodiment. Hereinafter, a processing flow will be described using the vehicle 100, the information processing device 300, and the secondary-use-related user terminal 200. First, the vehicle 100 acquires information (for example, initial information, the number of times of charging, and charging execution information) about the battery 140 mounted in the vehicle 100 (step S100). Next, the data generation device 150 generates battery data (step S102). Next, the communication device 160 transmits the battery data to the information processing device 300 (step S104).

Next, in the secondary-use-related user terminal 200, the purchase requestor 250 generates request information about the battery to be secondarily used (step S106) and causes the information processing device 300 to transmit the generated request information via the communicator 210 (step S108).

Next, in the information processing device 300, the analyzer 330 analyzes a market value based on the supply and demand of the battery on the basis of the battery data transmitted from the vehicle 100 and the request information transmitted from the secondary-use-related user terminal 200 (step S110). Next, the provider 340 generates the provision data based on the analysis result (step S112) and transmits the generated provision data to the vehicle 100 (step S114).

In the vehicle 100, the display device 180 causes the display 182 to display information about the battery 140 and battery data or causes the display 182 to display the data provided by the information processing device 300 (step S116). Also, when there is an instruction from the user as described above, the display device 180 may make an inquiry to the information processing device 300 (step S118), acquire an inquiry result (step S120), and cause the display 182 to display the inquiry result (step S122). Also, when an instruction for selling the battery has been received from the user, the display device 180 transmits information about the sale instruction to the information processing device 300 (step S124).

In the information processing device 300, when the acquirer 320 receives the sale instruction from the vehicle 100, the acquirer 320 identifies the secondary-use-related user terminal 200 requesting the purchase of the battery for which the sale instruction is given and transmits the battery information and response information about the battery purchase request to the identified secondary-use-related user terminal 200 (step S126). In the secondary-use-related user terminal 200, the output controller 270 displays the response information acquired by the acquirer 260 on the display 230 (step S128). Also, the acquirer 260 transmits purchase determination information to the information processing device 300 when the secondary-use-related user gives a purchase instruction (step S130). Thereby, the process of the present sequence ends. In the example of FIG. 13, after the processing of step S112, the information processing device 300 may also transmit the provision data and the information about the analysis result to the secondary-use-related user terminal 200 and cause the secondary-use-related user terminal 200 to display the provision data and the information about the analysis result.

The information processing device according to the above-described embodiment includes the acquirer 320 configured to acquire battery data transmitted from the vehicle 100 equipped with the battery 140 storing electric power for traveling; the analyzer 330 configured to analyze value information of the battery 140 on the basis of the battery data acquired by the acquirer 320 and request information from a secondary-use-related user who uses the battery 140 secondarily; and the provider 340 configured to provide provision data about a sale of the battery 140 on the basis of the value information of the battery 140 analyzed by the analyzer 330, whereby it is possible to promote the distribution of the secondary battery for secondary use in a better state.

Specifically, according to the present embodiment, the user of the vehicle can more appropriately ascertain the value of the battery and the guideline at the time of selling from the time when the vehicle is in use. Also, by allowing the user of the vehicle to recognize that the value changes with the battery state, the motivation to limit the deterioration of the battery is increased and the quality of the battery can be expected to be improved. As a result, it is possible to supply the battery for secondary use in a good state to the secondary-use-related user. Therefore, the secondary-use-related user can secure a higher-quality battery and ascertain the number of batteries, which enables more appropriate business development.

Although modes for carrying out the present invention have been described using embodiments, the present invention is not limited to the embodiments, and various modifications and substitutions can also be made without departing from the scope and spirit of the present invention.

REFERENCE SIGNS LIST

1 Information processing system
100 Vehicle
112 Motor
114 Drive wheels
116 Brake device
120 Vehicle sensor
130 PCU
140 Battery
142 Battery sensor
150 Data generation device
152 Generator
154, 280, 350 Storage
160 Communication device
170 Charging port
172 Converter
180 Display device
182 Display
184 Display controller
200 Secondary-use-related user terminal
210, 310 Communicator
220 Input
230 Display
240 Speaker
250 Purchase requestor
260, 320 Acquirer
270 Output controller
300 Information processing device
330 Analyzer
340 Provider
400 Charging facility
NW Network

What is claimed is:

1. An information processing device comprising:
a processor that executes instructions to:
acquire secondary battery information about a secondary battery transmitted from a vehicle equipped with the secondary battery storing electric power for traveling;
analyze value information of the secondary battery on the basis of the secondary battery information and request information from a secondary-use-related user who uses the secondary battery; and
provide provision information about a sale of the secondary battery on the basis of the value information of the secondary battery,
wherein the processor analyzes the required number of secondary batteries and a purchase price according to each of a region and a state rank of the secondary battery on the basis of position information and a purchase request of the secondary-use-related user,
wherein the state rank is derived by a degradation of a charge capacity of the secondary battery.

2. The information processing device according to claim 1, wherein the processor analyzes a change in a value of the secondary battery according to the elapse of time.

3. The information processing device according to claim 1, wherein the processor provides a user of the vehicle with a usage method for limiting deterioration in the secondary battery.

4. The information processing device according to claim 1, wherein the processor provides a user of the vehicle with information about a timing when the secondary battery is sold.

5. The information processing device according to claim 1, wherein the processor provides the provision information to the vehicle at a prescribed timing.

6. The information processing device according to claim 1,
wherein the processor further executes instructions to: display an image including the provision information,
wherein the processor causes a display mode of the image, which is displayed on a plurality of displays, to differ in accordance with a state of the vehicle or a situation of an operation of an occupant on the vehicle.

7. An information processing method comprising:
acquiring, by a computer, secondary battery information about a secondary battery transmitted from a vehicle equipped with the secondary battery storing electric power for traveling;
analyzing, by the computer, value information of the secondary battery on the basis of the acquired secondary battery information and request information from a secondary-use-related user who uses the secondary battery;
providing, by the computer, provision information about a sale of the secondary battery on the basis of the analyzed value information of the secondary battery; and
analyzing, by the computer, the required number of secondary batteries and a purchase price according to each of a region and a state rank of the secondary battery on the basis of position information and a purchase request of the secondary-use-related user,
analyzing, by the computer, value information of the secondary battery on the basis of how many batteries of which state rank are insufficient in the associated region for classified request information,
wherein the state rank is derived by a degradation of a charge capacity of the secondary battery.

8. A non-transitory computer-readable storage medium that stores a program to be executed by a computer to perform at least:

acquire secondary battery information about a secondary battery transmitted from a vehicle equipped with the secondary battery storing electric power for traveling;

analyze value information of the secondary battery on the basis of the acquired secondary battery information and request information from a secondary-use-related user who uses the secondary battery;

provide provision information about a sale of the secondary battery on the basis of the analyzed value information of the secondary battery; and analyze the required number of secondary batteries and a purchase price according to each of a region and a state rank of the secondary battery on the basis of position information and a purchase request of the secondary-use-related user, wherein the state rank is derived by a degradation of a charge capacity of the secondary battery.

9. An information processing device comprising:

a processor that executes instructions to:

acquire secondary battery information about a secondary battery transmitted from a vehicle equipped with the secondary battery storing electric power for traveling;

analyze value information of the secondary battery on the basis of the secondary battery information and request information from a secondary-use-related user who uses the secondary battery;

provide provision information about a sale of the secondary battery on the basis of the value information of the secondary battery; and display an image including the provision information, wherein the processor causes a display mode of the image, which is displayed on a plurality of displays, to differ in accordance with a state of the vehicle or a situation of an operation of an occupant on the vehicle, wherein the processor analyzes the value information of the secondary battery according to each of a region and a state rank of the secondary battery on the basis of position information and a purchase request of the secondary-use-related user, wherein the state rank is derived by a degradation of a charge capacity of the secondary battery.

\* \* \* \* \*